(12) United States Patent
Vejnar

(10) Patent No.: US 6,932,404 B2
(45) Date of Patent: Aug. 23, 2005

(54) RETRACTABLE AUXILIARY TAILGATE

(76) Inventor: Mark Willard Vejnar, 6684 Lookout Ter., Riverside, CA (US) 92505

( * ) Notice: Subject to any disclaimer, the term of this patent is extended or adjusted under 35 U.S.C. 154(b) by 0 days.

(21) Appl. No.: 10/783,639

(22) Filed: Feb. 20, 2004

(65) Prior Publication Data

US 2005/0073165 A1 Apr. 7, 2005

Related U.S. Application Data

(62) Division of application No. 09/795,170, filed on Feb. 27, 2001, now Pat. No. 6,742,822.

(51) Int. Cl.[7] .............................................. B62D 33/03
(52) U.S. Cl. ................................... 296/26.09; 296/57.1
(58) Field of Search ........................... 296/26.08–26.11, 296/57.1

(56) References Cited

U.S. PATENT DOCUMENTS

| | | | | |
|---|---|---|---|---|
| 5,478,130 A | * | 12/1995 | Matulin et al. | ............ 296/57.1 |
| 6,364,392 B1 | * | 4/2002 | Meinke | ........................ 296/62 |
| 6,454,338 B1 | * | 9/2002 | Glickman et al. | ......... 296/57.1 |
| 6,698,810 B1 | * | 3/2004 | Lane | .............................. 296/3 |

* cited by examiner

*Primary Examiner*—Dennis H. Pedder
(74) *Attorney, Agent, or Firm*—Robert N. Schlesinger

(57) ABSTRACT

This Retractable Auxiliary Tailgate relates to a new and useful tailgate design for trucks, vans, sport utility vehicles, station wagons, and the like, and may be used to effectively extend the length of a vehicle's payload section.

3 Claims, 13 Drawing Sheets

RETRACTABLE AUXILIARY TAILGATE

CROSS-REFERENCES TO RELATED APPLICATIONS

This is a Divisional Patent Application; the parent patent application being Ser. No. 09/795,170, filed on Feb. 27, 2001, and published as U.S. patent application Ser. No. 2002/0121794, on Sep. 5, 2002, and issued as U.S. Pat. No. 6,742,822 (2004). The entire declaration, oath, specification, disclosure, and drawing figures, and each of them, from said parent patent application and said issued patent, of the present divisional patent application, are hereby incorporated herein by reference, thereto.

STATEMENT REGARDING FEDERALLY SPONSORED RESEARCH OR DEVELOPMENT

Not Applicable

Reference to a "Microfiche Appendix"

Not Applicable

BACKGROUND OF THE INVENTION

This invention, entitled "Retractable Auxiliary Tailgate", was devised and invented by Mark Willard Vejnar, and relates to a new and useful type of tailgate that may be used to effectively extend the payload area or truck bed for a pickup truck, mini-truck, or the like.

This "Retractable Auxiliary Tailgate" invention will be referred to throughout this specification and its appended claims, as a proper noun with the first letter of each word capitalized. The back panel (5) component of the Retractable Auxiliary Tailgate is the primary component, and the terms are therefore nearly synonymous.

The term "truck" as used throughout this specification and its appended claims is intended to also refer to a pickup truck, mini-truck, or a small or medium-sized truck with either an open payload bed or a covered payload bed. The term "truck" is also intended to be broadly construed to include sport utility vehicles, multipurpose vehicles, minivans, station wagons, and trailers, where the tailgate may be opened to a position that is generally parallel to the ground, as shown in the Drawing Figures.

FIELD OF THE INVENTION

The field of this invention relates to a new and useful tailgate design for trucks and the like, and most particularly for pickup trucks. The Retractable Auxiliary Tailgate disclosed herein, may be effectively used as a tailgate in a variety of trucks and closely related vehicles that may be used for hauling objects or loads that may shift or move during transport in a truck bed (1) or the like.

Description of the Related Art Including Information Disclosed Under 37 CFR 1.97 AND 1.98

Heretofore, the safe transport of an object was limited to the size of the payload area or truck bed (1) or the like, and many mini-truck designs, particularly in recent years, have a short truck bed (1) or payload area. It is not uncommon for an object or load, such as a standard piece of four foot by eight foot plywood, drywall, lumber material, ladders, refrigerators, sofas, and other large objects, to be a matter of inches to several feet too long to fit safely into a truck bed (1). One solution to this problem may be to drop the primary tailgate (3) down and allow the long object to extend out of the truck bed (1) for a short distance. This means of transporting a large object, however, may cause safety problems and may be a violation of the law in some jurisdictions. It is not uncommon for large objects and loads to fall out of a truck bed (1), particularly when the tailgate is in the down position, and for these large objects and loads to fall onto a freeway or highway, thereby damaging the objects and causing hazard to the truck driver and to other drivers.

The inventor, Mark Willard Vejnar, has devised and invented a new and useful type of Retractable Auxiliary Tailgate, for a truck or the like, that may easily be used to effectively extend the length of the truck bed (1), and additionally would effectively secure a payload within the truck bed (1). The means for securing a payload within the truck bed (1) is with a Retractable Auxiliary Tailgate being opened to the vertical up position, as shown in FIG. 1.

BRIEF SUMMARY OF THE INVENTION

In trying to solve the above-described truck and automobile industry problems and disadvantages, and within the scope of this invention, the inventor, Mark Willard Vejnar, conceived, devised, invented, and engineered the new and useful means of effectively extending the effective truck bed (1) of a truck or the like, through the use of an Retractable Auxiliary Tailgate.

The objectives and advantages of the present Retractable Auxiliary Tailgate invention include its hideaway feature which allows the user to optionally use the Retractable Auxiliary Tailgate by pulling the Retractable Auxiliary Tailgate, out of its hideaway position. The Retractable Auxiliary Tailgate may be tucked away into the primary tailgate (3) of a truck or the like, until the user elects to use the Retractable Auxiliary Tailgate. For some applications, the user may elect to utilize the Retractable Auxiliary Tailgate by placing it in the horizontal open position, and also utilize and open an optional retractable stop (21) or the like, located at the terminal end of said horizontal open Retractable Auxiliary Tailgate.

Another objective and advantage of the Retractable Auxiliary Tailgate invention is that it may optionally be composed of a polymeric or composite material, rather than the metal or alloy generally comprising the primary tailgate. The use of a polymeric or composite composition for the Retractable Auxiliary Tailgate may reduce the cost of materials and allows one to mold the parts, thereby further reducing the costs. Other advantages of utilizing polymeric or composite materials, rather than a metal or alloy, includes a lighter weight and lower hardness.

The Retractable Auxiliary Tailgate invention is a valuable means of effectively and safely extending the payload area or truck bed (1) for some mini-trucks or short-bed trucks that would otherwise have limited utility in transporting furniture, such as sofas, refrigerators and bookshelves, and transporting construction materials, such as plywood, drywall, and lumber, from site-to-site, or from lumber yard to construction site.

BRIEF DESCRIPTION OF THE DRAWING FIGURES

The drawing figures reflect selected embodiments of the Retractable Auxiliary Tailgate, and as intended for use with a pickup truck, but the Retractable Auxiliary Tailgate is not limited to use with a pickup truck, and may be effectively used with other vehicles, as disclosed above, and may have applications on other types of vehicles, trailers, and the like, as well as in other industries where large objects or payloads may be transported, or where a Retractable Auxiliary Tailgate, is desired or is a practical addition to a design feature.

Referring again to the drawing figures, like reference numerals are used to refer to like specific parts of the various drawing figures. The tailgate nomenclature is defined as the primary tailgate (3), which is essentially the traditional tailgate with a hideaway back panel (5), which is generally attached to the primary tailgate (3) near the top edge of said primary tailgate (3), as shown in FIGS. 1–8. The hideaway back panel (5) is the major element or component of the Retractable Auxiliary Tailgate, and is therefore nearly equivalent to or synonymous to the Retractable Auxiliary Tailgate. Technically, the Retractable Auxiliary Tailgate includes the back panel (5), but also includes the less noticeable components, such as the horizontal back panel hinge (7), the optional back panel handle (6) and the various components used in the back panel locking means, to complete the Retractable Auxiliary Tailgate. The nomenclature for the position of the primary tailgate (3) and back panel (5) is defined as being in a horizontal or vertical position, and being further defined as being in the horizontal open or closed position, or in the vertical open position, as shown in Drawing Figures.

Figure 11:
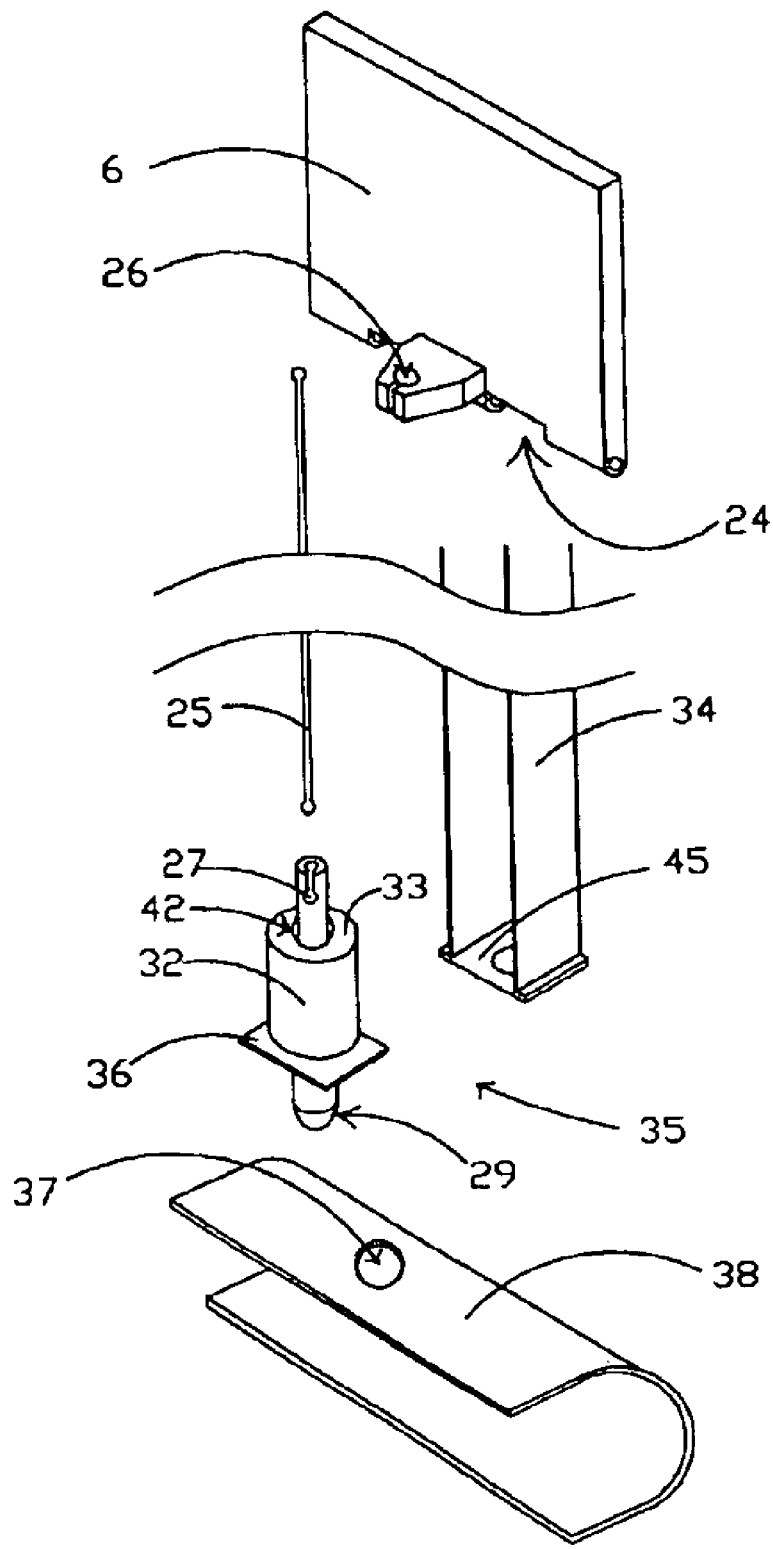

FIG. 11 shows an exploded isometric side view of the components and assembly of the back panel cable housing (34) of a Retractable Auxiliary Tailgate, with the components associated with the cable spring housing (32) assembled and ready for insertion into the back panel cable housing (34), and showing how the mount flange (36) on the cable spring housing (32) fits into the back panel cable housing (34).

Figure 12:
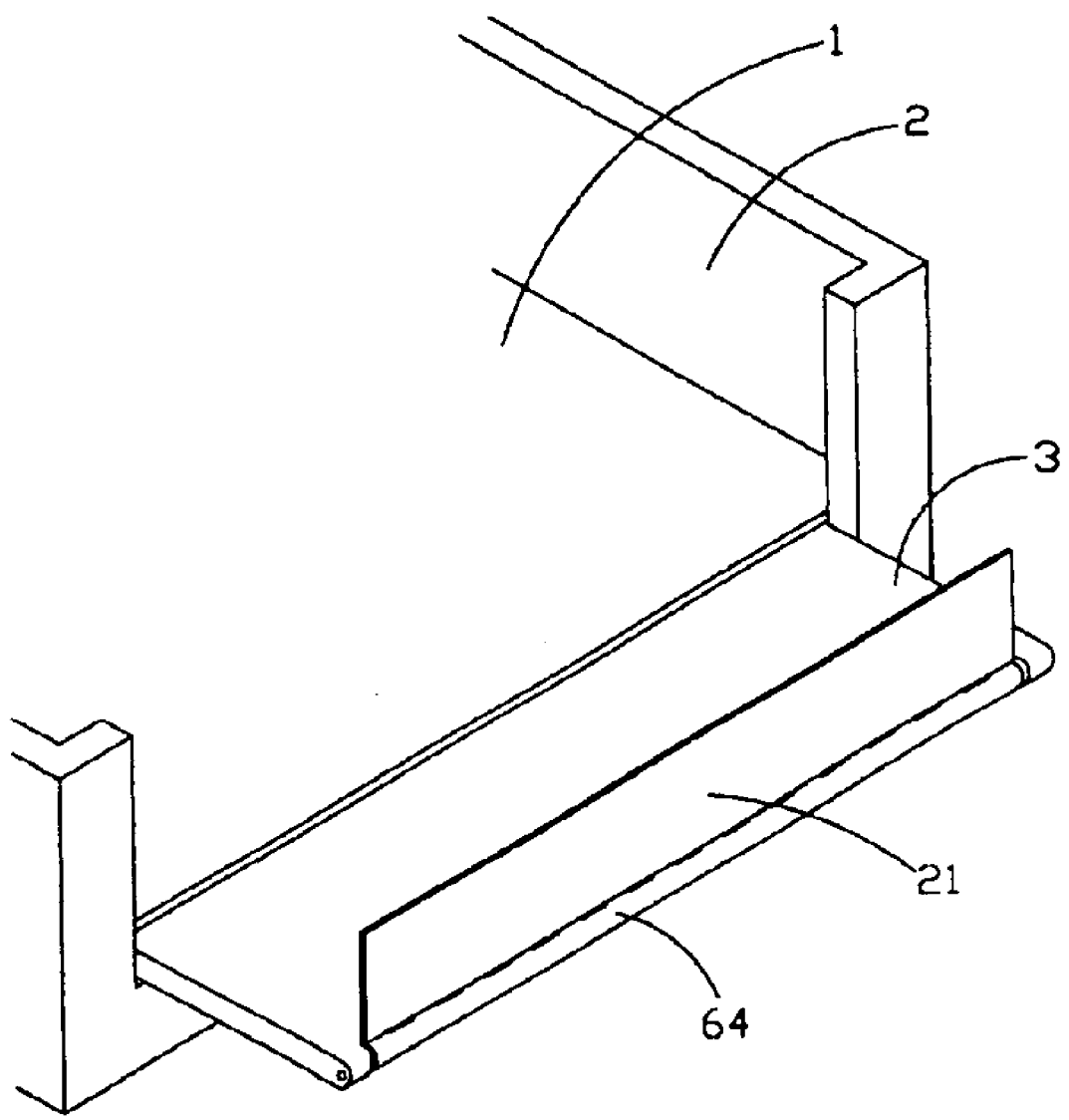

FIG. 12 shows an isometric rear view of a Retractable Auxiliary Tailgate in the closed position, and showing a retractable stop (21) in the open position.

Figure 13:
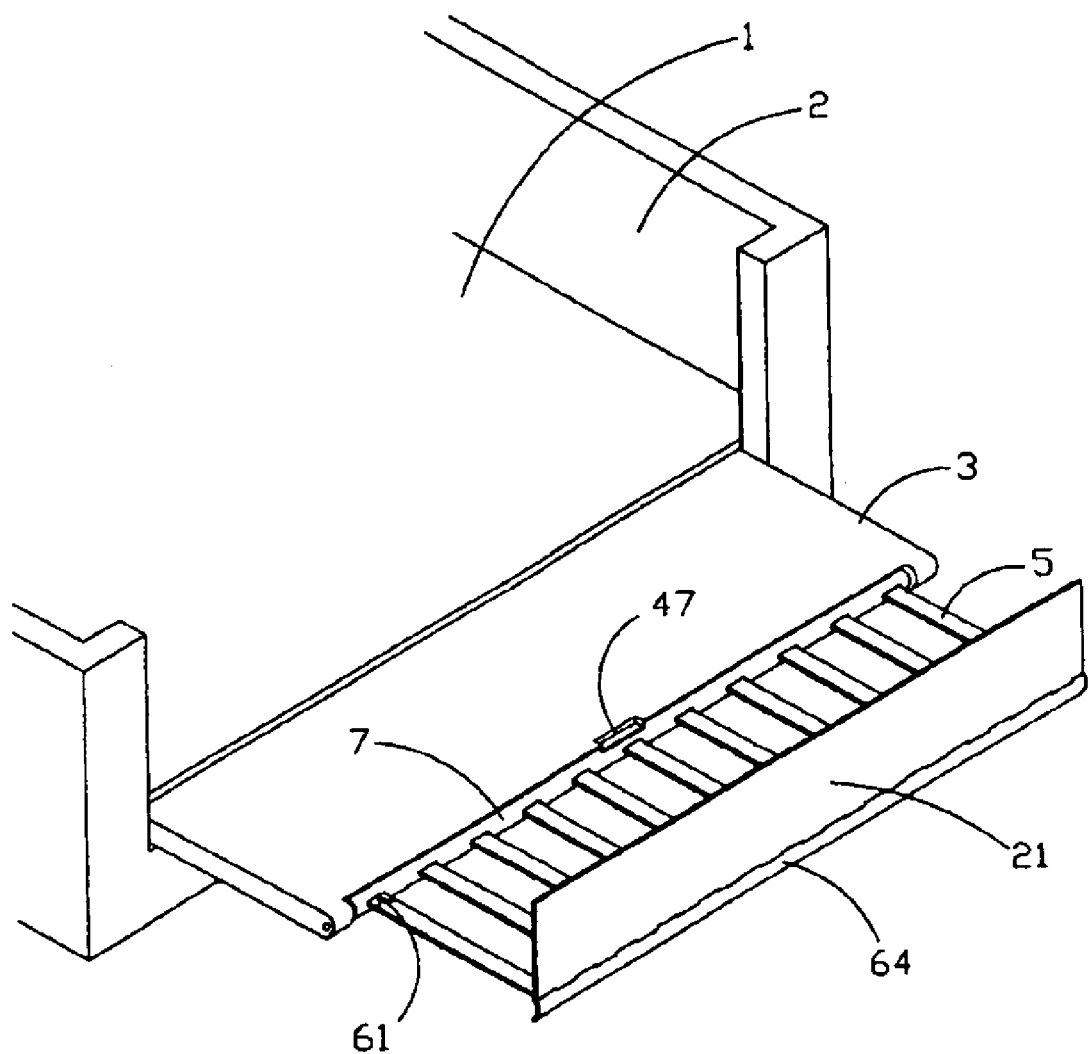

FIG. 13 shows an isometric rear view of a Retractable Auxiliary Tailgate in the horizontal open position, and showing a retractable stop (21) in the open position.

DETAILED DESCRIPTION OF THE REFERENCE NUMERALS

Referring now to the drawing figures, like reference numerals are used to refer to like specific parts of the various Drawing Figures and components cited in the specification. The enumeration of the reference numerals in the present specification follows the enumeration of the parent patent application cited above. The description of the reference numerals used to describe the various parts of the Drawing Figures and the specification and its appended claims follows.

The truck bed (1) is the bed, payload area, cargo area, or the like, that is located in the rear portion of a truck or the like, and may be an open or closed truck bed (1). The truck bed (1) generally extends from the back of the cab of a truck to the primary tailgate (3) of a truck.

The truck bed wall (2) is the wall or the like that is generally perpendicular to and extends in a vertical direction from the attached horizontal truck bed (1). The truck bed wall (2) generally extends about three sides of the truck bed (1) perimeter, and generally excludes the primary tailgate (3) area. There is typically a left, a right and a front truck bed wall (2) in most trucks or the like, and particularly pickup trucks.

The primary tailgate (3) is the tailgate that may be factory issue and is located at the terminal end of the truck bed (1), and may be used to enclose the terminal end of the truck bed (1) with a component, i.e., the tailgate, that effectively acts as fourth truck bed wall (2).

Figure 1:
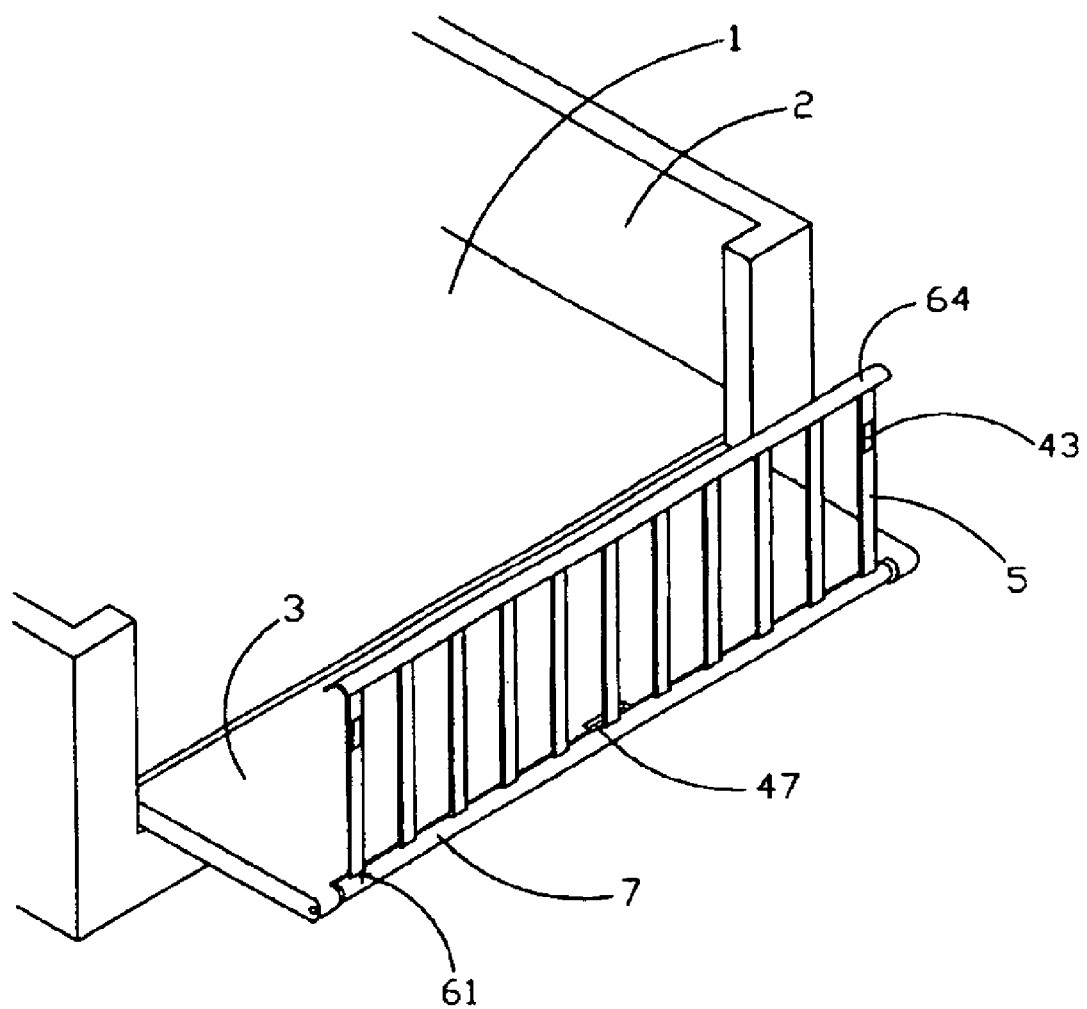
FIG. 1 shows an isometric rear view of a Retractable Auxiliary Tailgate with a retractable open frame back panel (5) in the vertical open position.

The open fame back panel (5) is the major component of the Retractable Auxiliary Tailgate, which acts as a secondary tailgate or fourth truck bed wall (2), when the primary tailgate (3) is in the horizontal open position, and the back panel (5) is raised to the vertical open position, as shown in FIG. 1. The open frame back panel (5) is partially open and has a bar-like or a frame-like appearance, as shown, for example, in FIGS. 1–5. The open frame back panel (5) is preferred in the Retractable Auxiliary Tailgate because of the aerodynamic advantages of a more streamlined flow than is found in a typical tailgate (3), and because with the open-frame back panel (5), one may enclose the truck bed (1), and have over-sized objects such as lumber or piping extending through said open-frame back panel (5) a safe distance, and in a manner that said over-sized objects will be transported in a more stable position, and will not roll around in the truck bed (1). Throughout this specification and its appended claims, the term back panel (5) may also be interpreted to also refer to the open-frame back panel (5).

The back panel handle (6) is the optional handle, grip, finger catch, finger hole or holes, or the like, that is be used to raise or lower the back panel (5), and in some embodiments of the Retractable Auxiliary Tailgate, to control the hinge pin (8), thereby controlling the fixed position of the back panel (5). The top rail (64), described below, may in some embodiments be synonymous with a back panel handle (6), and in some of these embodiments, the handle recessed area (47), described below, may provide easier access to manipulate the top rail (64), said top rail (64) thereby functioning as a handle.

Figure 3:
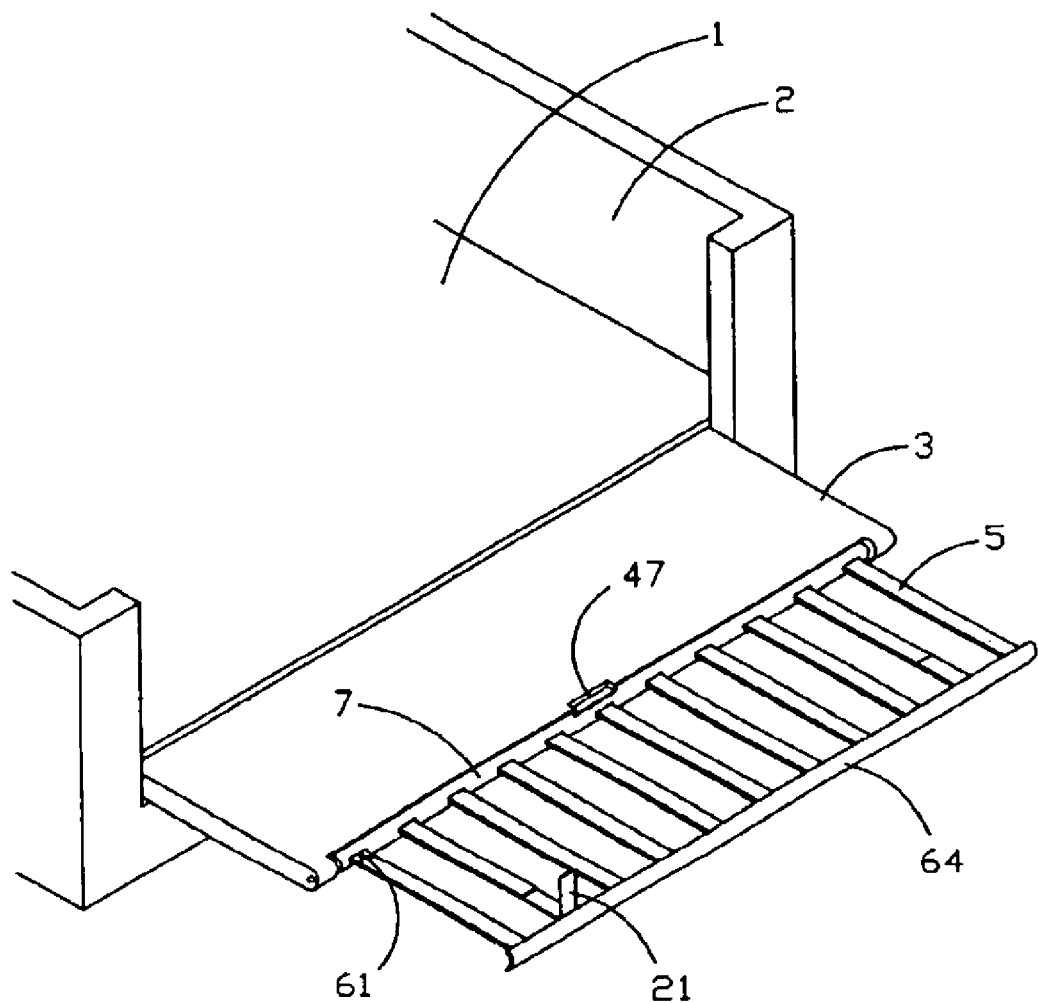
FIG. 3 shows an isometric rear view of a Retractable Auxiliary Tailgate with a retractable open frame back panel (5) in the horizontal open position.

The horizontal back panel hinge (7) is the hinge, pivot point, pivot line, or the like, which is located at the interface between the back panel (5) and the primary tailgate (3). The horizontal back panel hinge (7) is the means and mechanism that allows the back panel (5) to rotate from the horizontal open position to the vertical open position, as shown in FIGS. 3 and 1, and a closed position to the open positions, and back to the horizontal open position. The horizontal back panel hinge (7) may, in some embodiments, contain the set of hinge pin ports (9) for securing the back panel (5) into position. Throughout this specification and its appended claims, reference to a horizontal back panel hinge (7) would also include the hinge pin (8) for said hinge (7), unless otherwise noted.

The hinge pin (8) is the pin, tongue, rod, axle, or the like, that matedly may fit into a hinge pin port (9), and through a hole or channel in a hinge (7), thereby allowing the hinge (7) to rotate about the axis of the hinge pin (8). The hinge pin (8) is the means that effectively attaches the back panel (5), and an optional retractable stop, and is also the means that effectively attaches the back panel (5) to the primary tailgate (3).

The hinge pin port (9) is the port, receptacle, hole, channel, or the like, that matedly receives the hinge pin (8), and may thereby lock the back panel (5) into a pre-set position onto the primary tailgate (3), and may also thereby lock an optional hinged retractable stop into a pre-set position onto the primary tailgate (3) or the back panel (5).

Figure 10:
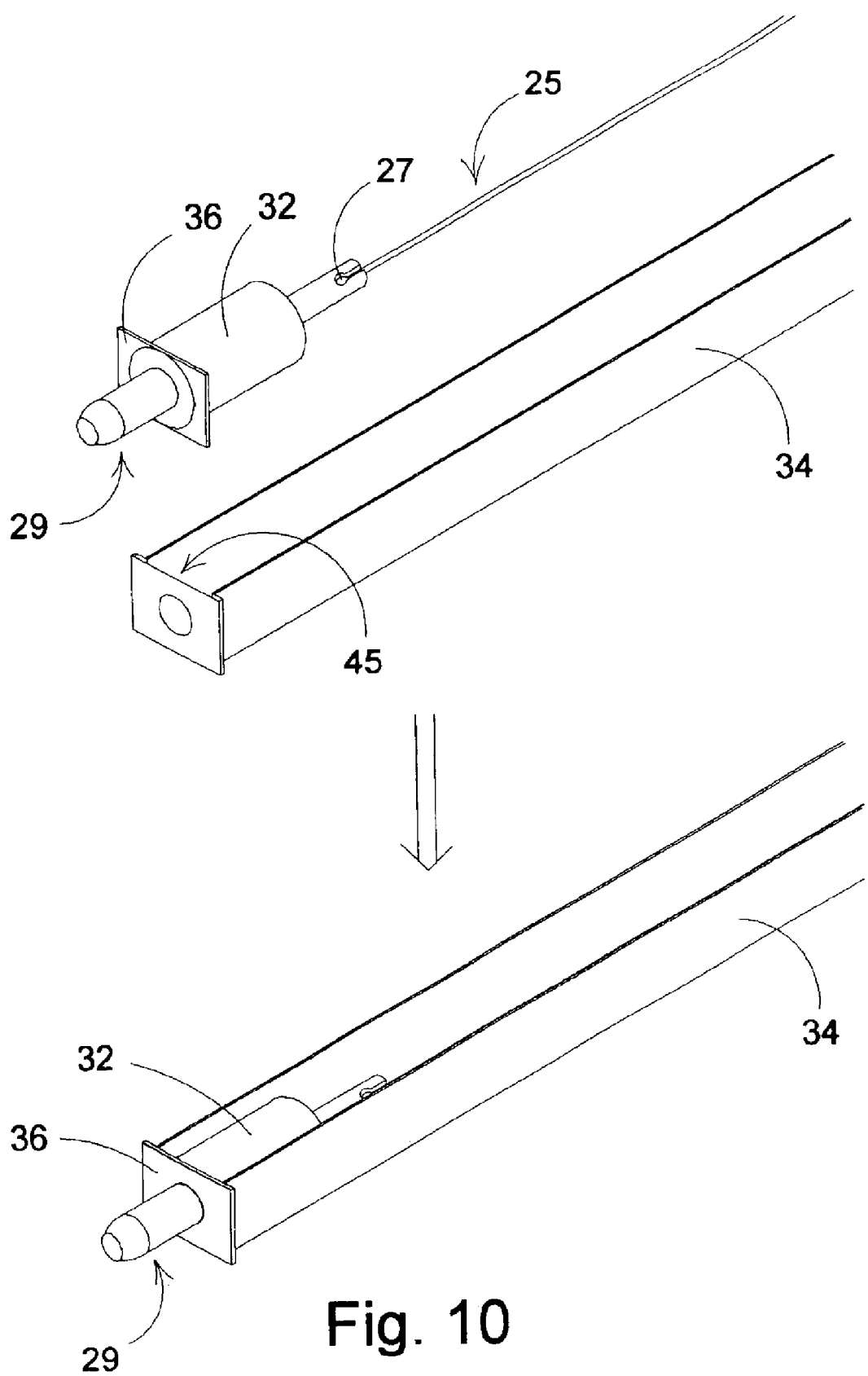
FIG. 10 shows an exploded isometric view of the components and assembly of the cable spring housing (32) of a Retractable Auxiliary Tailgate, assembled and ready for insertion into the back panel cable housing (34), and showing how the cable spring housing (32) fits into the back panel cable housing (34).

The handle hinge (24) is the optional hinge, pivot point, pivot line, or the like, that allows a back panel handle (6) to rotate about the axis of the handle hinge (24), thereby activating an optional mechanism comprised of an attached cable (25), and its tethered cable pin (29), as shown in FIGS. 10 and 11.

The cable (25) is the cable, line, wire, tether, or the like, that is attached at one end to the optional handle hinge (24) in a first cable port (26), and is attached at the opposite end to a second cable port (27), that is typically protruding from the cable spring housing (32). The cable (25) may be composed of a metal, alloy, polymeric, or composite material, as the strength requirements may demand. A preferred embodiment would utilize a stainless steel cable (25). This cable based mechanism is optional.

The first cable port (26) is the optional port, slot, receptacle, or the like, that is attached, affixed or located on the hidden side of the optional back panel handle (6), and securely receives and holds one of the two ends of the optional cable (25).

The second cable port (27) is the optional port, slot, receptacle, or the like, that is typically protruding from the cable spring housing (32), and securely receives and holds the terminal end of the optional cable (25).

The cable pin (29) is the pin, tongue, rod, or the like, that is attached, affixed, or extending from behind the cable spring stop (31), and when activated, will matedly fit, by cable spring (30) action, into one of a plurality of cable pin ports (37), thereby affixing the position of the back panel (5). The cable pin (29) may be removed from a cable pin port (37) by manual action on the hinged back panel handle (6), thereby compressing the cable spring (30) to another desired position where there is a cable pin port (37) to receive the cable pin (29), including the closed position.

The cable spring (30) is the optional compression spring or the like, that is located between the cable spring housing back (33) and the cable spring stop (31), and when released, forces the cable pin (29) into a cable pin port (37). Manual pressure on the back panel handle (6) compresses the cable spring (30), thereby releasing the cable pin (29) from the cable pin port (37 to the desired position where there is a cable pin port (37) to receive the cable pin (29).

The cable spring stop (31) is the barrier, stop, or the like, that restrains the terminal end of the cable spring (30), in the cable spring housing (32).

Figure 9:
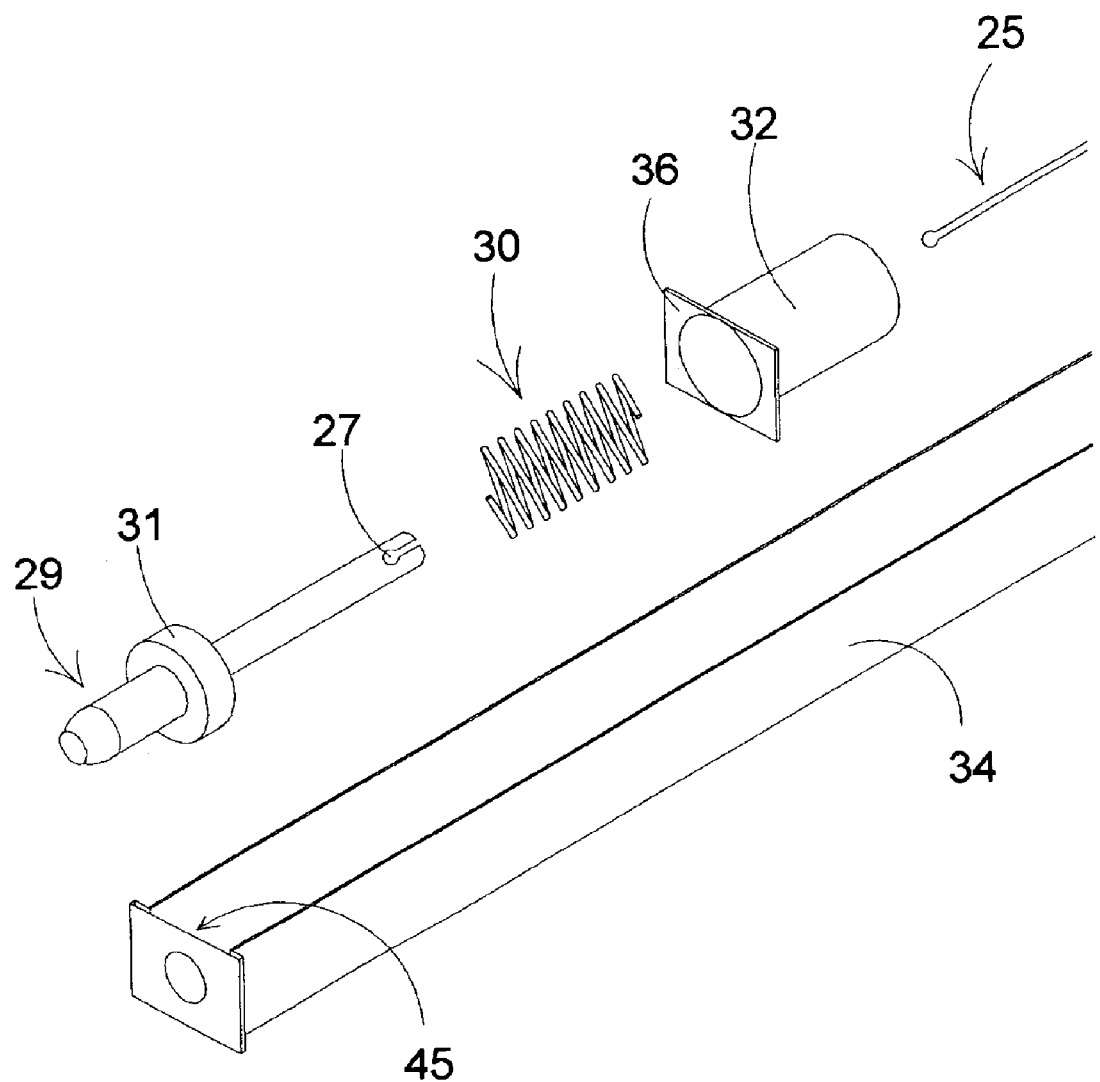
FIG. 9 shows an exploded isometric view of the components comprising a preferred embodiment of the cable spring housing (34), which is a preferred locking means for affixing a back panel (5) of a Retractable Auxiliary Tailgate, into the desired position.

The cable spring housing (32) is the housing, case, or the like, that houses the cable spring (30), and the cable spring stop (31), as shown in FIGS. 9–11.

The cable spring housing back (33) is the barrier, stop, or the like, that restrains the end of the cable spring (30) that is opposite its terminal end. A preferred embodiment of the cable spring housing back (33) has a centrally located hole or cable orifice (42), through which the second cable port (27) and the cable (25) protrude, as shown in FIG. 11.

The back panel cable housing (34) is the tube, pipe, channel, enclosure, or the like, which houses or encases the cable from the vicinity of the optional back panel handle (6) to the vicinity of the cable spring housing (32), and provides protection for the cable (25).

The cable housing mount (35) is the component comprised essentially of a cable spring housing (32), the cable pin (29), and the mount flange (36).

The mount flange (36) is the flange, plate, rim, or the like, that is generally perpendicular to the external surface of the optional cable spring housing (32), such that said mount flange (36) allows the cable housing mount (35) to fit securely into the mount flange port (45), located at the terminal end of the back panel cable housing (34). To fit the cable housing mount (35) into the back panel cable housing (34), the cable spring (30) should be compressed, to withdraw the cable pin (29) into the cable spring housing (32), as shown FIGS. 10 and 11.

The cable pin port (37) is the port, hole, orifice, slot, or the like, that receives the spring-loaded cable pin (29), thereby affixing the position of the back panel (5).

The pin port housing (38) is the set of cable pin ports (37), arranged in a linear manner. The pin port housing (38) may in some embodiments be one or more of the slide-out rails on the open frame back panel (5).

The cable orifice (42) is the orifice, hole, port, or the like, that is located on the top surface of the cable spring housing (32), and through which the second cable port (27) extends through, as shown in FIG. 11, and would receive the cable (25).

The reflector (43) is the optional one or more reflectors or reflector strips the may be attached or affixed to the back panel (5), and are a safety feature located on the rear side, and would be visible from behind the truck, when the back panel (5) is in the vertical open position.

The mount flange port (45) is the port, receptacle, slot, or the like, that receives the mount flange (36), which is near the base of the cable housing mount (35), and shown in FIGS. 9–11.

The handle recessed area (47) is the optional recessed area or sink located on the primary tailgate (3), which allows the user to insert their fingers to get an optimal hold of the back panel handle (6), or the top rail (64) as shown in FIGS. 1–5.

The tailgate hinge (52) is the hinge, or the like, that affixes the primary tailgate (3) to the truck bed wall (2) or the truck bed (1), depending upon the tailgate design.

Figure 5:
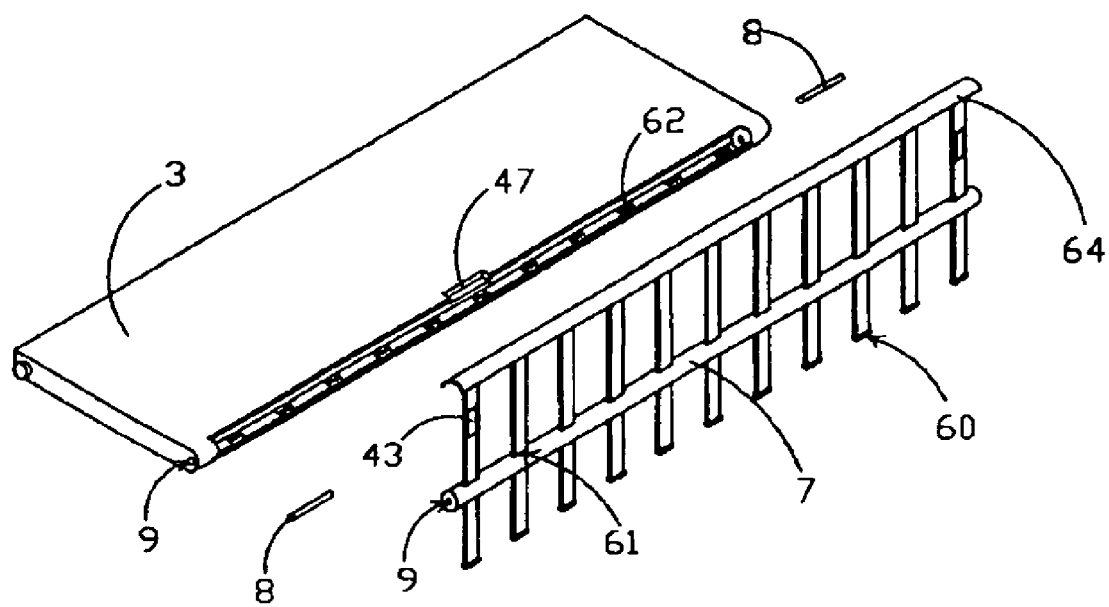
FIG. 5 shows an exploded isometric rear view of a Retractable Auxiliary Tailgate with an open frame back panel (5) that is retractable into the primary tailgate (3), and is shown partially retracted into the primary frame port (61).
Figure 7:
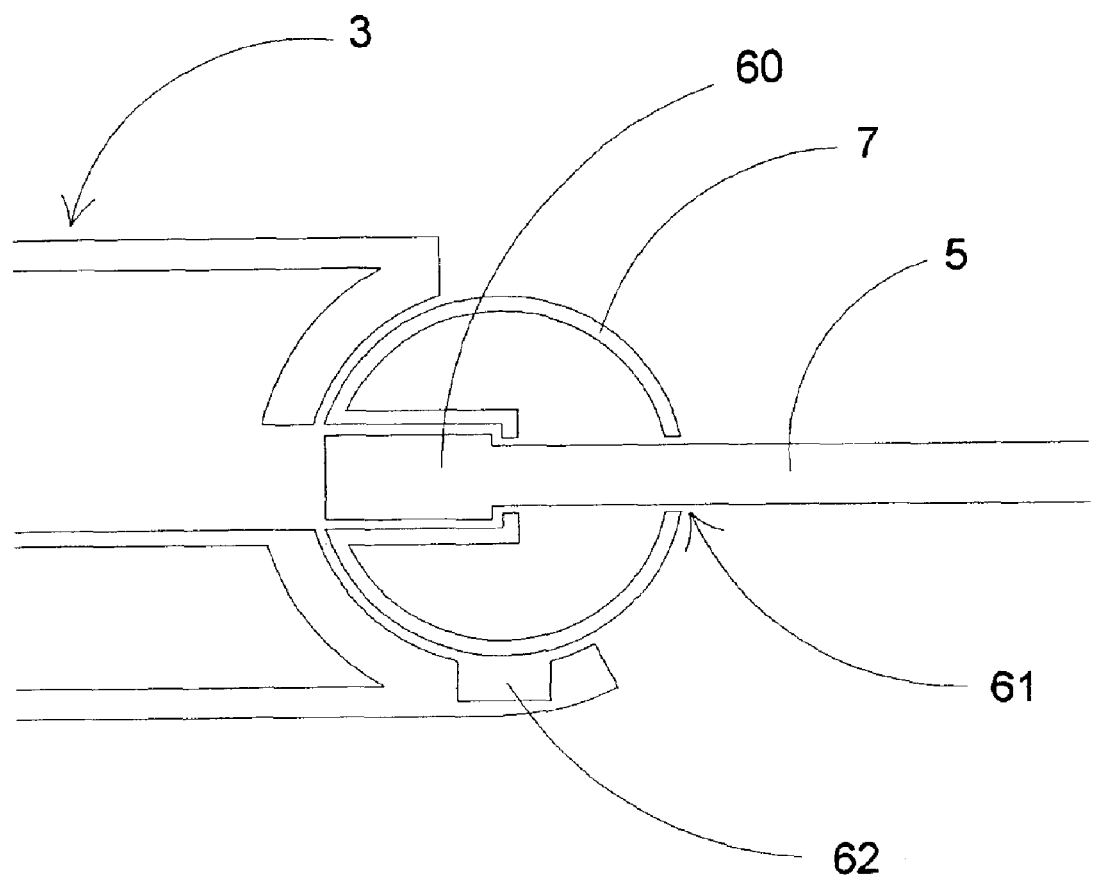
FIG. 7 shows a sectional side view of the area around the horizontal back panel hinge (7), for the slide-out Retractable Auxiliary Tailgate with a retractable open frame back panel (5) in the horizontal open position, as shown in FIG. 3.
Figure 8:
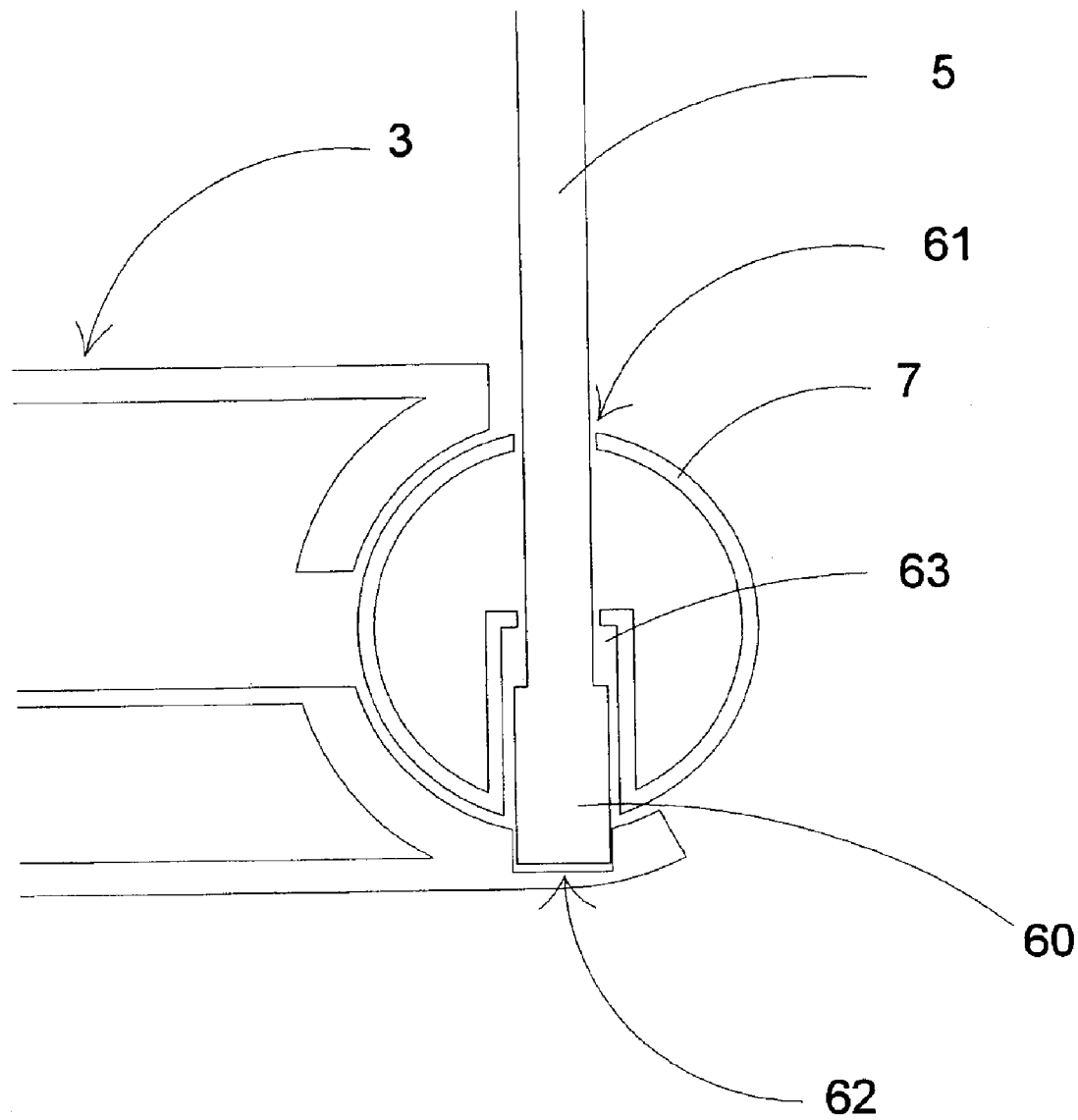
FIG. 8 shows a sectional side view of the area around the horizontal back panel hinge (7), for the slide-out Retractable Auxiliary Tailgate with a retractable open frame back panel (5) in the vertical open position, as shown in FIG. 1.

The frame lock (60) is the enlarged terminal end area of each vertical frame in the open frame back panel (5) embodiment, shown in FIGS. 5, 7, and 8, that is sized so that this enlarged terminal end area, the frame lock (60), is too large to fit through the frame lock port (63), the primary frame port (61), or the secondary frame port (62), thereby effectively locking the open frame back panel (5) onto the horizontal back panel hinge (7), as shown in FIGS. 5 and 7–8. The frame lock (60) fits into the frame lock port, as shown in FIGS. 7 and 8, but is retained by the frame lock port (61), when the open frame back panel (5) is fully extended, as shown in FIGS. 7–8, and then may slide down to the secondary frame port, as shown in FIG. 8, to hold the back panel (5) in the vertical open position, as shown in FIG. 1.

The primary frame port (61) is the port, hole, or orifice, located on the horizontal back panel hinge (7), and which is sized to allow a vertical frame on the open frame back panel (5) to pass through said port (61), thereby allowing the open frame back panel (5) to be retracted into the primary tailgate (3), as shown in FIGS. 1, 3–8.

The secondary frame port (62) is the port, hole, or orifice, that is sized and located near the top edge of the primary tailgate (3) and in-line with the primary frame port (61), so that a vertical frame on the open frame back panel (5) may set into said secondary frame port (62), thereby allowing the open frame back panel (5) to be locked into the vertical open position, as shown in FIGS. 1 and 8.

Figure 6:
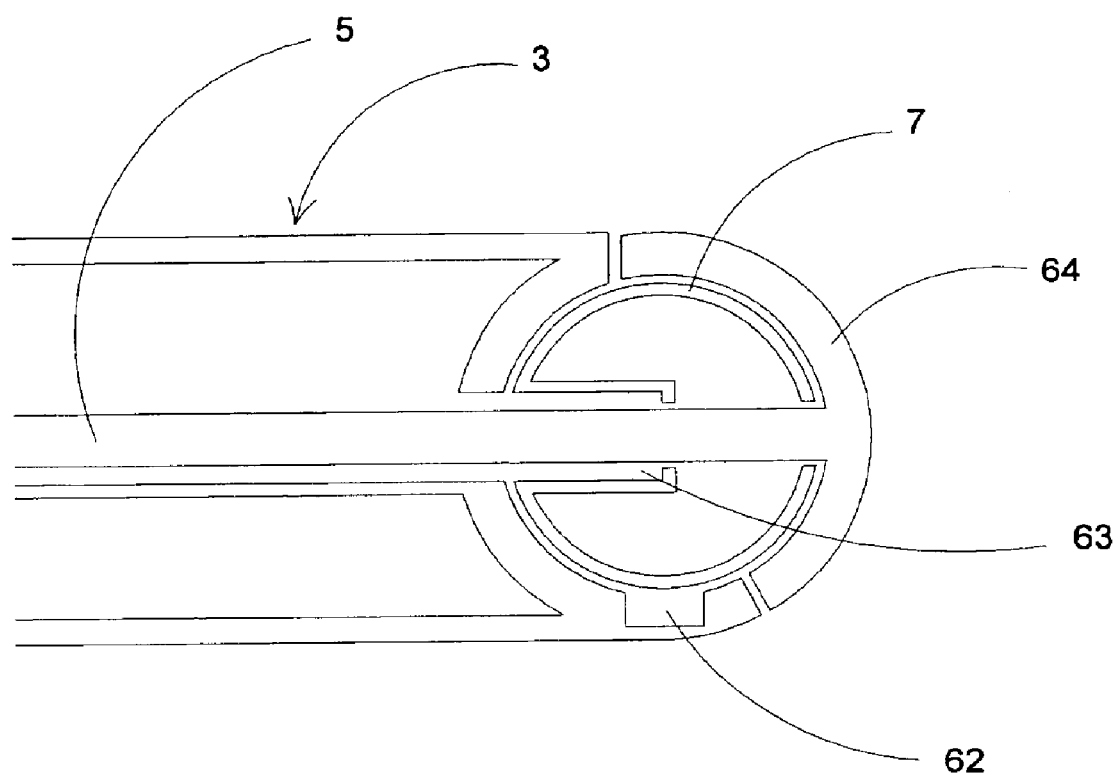
FIG. 6 shows a sectional side view of the area around the horizontal back panel hinge (7), for the slide-out open frame Retractable Auxiliary Tailgate, with a retractable open frame back panel (5) in the horizontal closed position, as shown in FIG. 2.

The frame lock port (63) is the is the port, or the like, that is located in the horizontal back panel hinge (7) area, as shown in FIGS. 6–8, and matedly receives the frame lock (60), when the open frame back panel is extended to the open position, as shown in FIGS. 7 and 8.

The top rail (64) is the rail, bar, frame, or the like, that is located at the terminal end of the open frame back panel (5), as shown in FIGS. 1–6. The top rail (64) may also be used as a handle (6) for the open frame back panel (5), and thereby used to push or pull the open frame back panel (5) in or out of the primary frame ports (61) and the secondary frame ports (62) on the primary tailgate (3), as shown in FIG. 5, and also to rotate the open frame back panel (5) about the horizontal back panel hinge's (7) axis, and into the vertical or the horizontal position.

DETAILED DESCRIPTION OF THE INVENTION

The present set of embodiments for this inventive concept may logically be classified as the set of Retractable Auxiliary Tailgates embodiments. The set of Retractable Auxiliary Tailgate embodiments disclosed herein are more numerous and may be subdivided into the subsets of solid body Retractable Auxiliary Tailgate embodiments, having a solid back panel, and the subset of the preferred open frame body Retractable Auxiliary Tailgate embodiments, as shown in FIGS. 1 and 3–5. These subsets of the Retractable Auxiliary Tailgate embodiments may each be further subdivided into subsets where the simple and modified simple embodiments of the Auxiliary Tailgate have one horizontal back panel hinge (7) or the like along a horizontal axis, and at the interface between the primary tailgate (3) and the back panel (5), and the preferred embodiments of the Retractable Auxiliary Tailgate, that utilize the cable based mechanism described above and elsewhere in this specification.

The Slide-Out Open Frame Embodiment of the Retractable Auxiliary Tailgate

Figure 2:
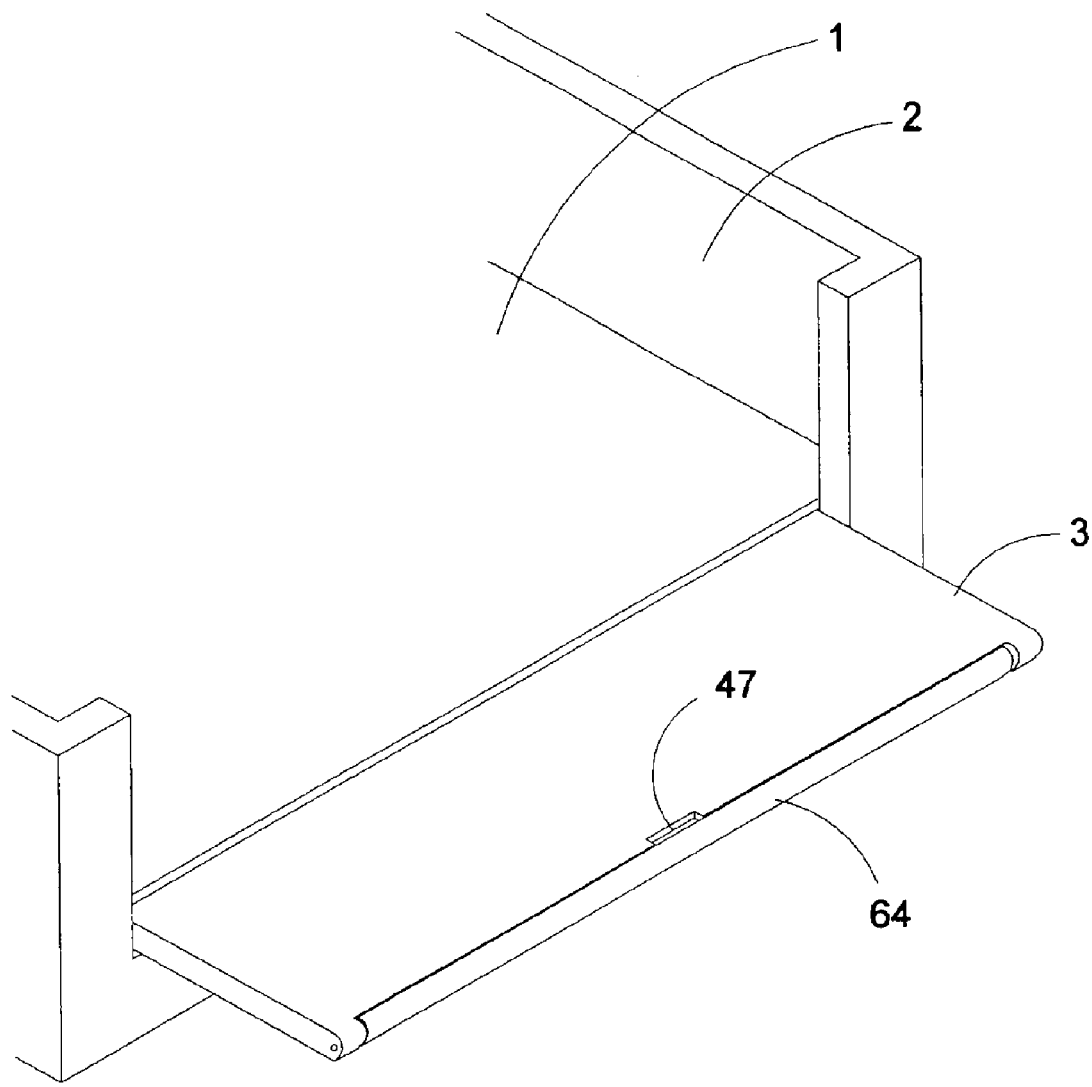
FIG. 2 shows an isometric rear view of a Retractable Auxiliary Tailgate with a retractable open frame back panel (5) in the horizontal closed position.
Figure 4:
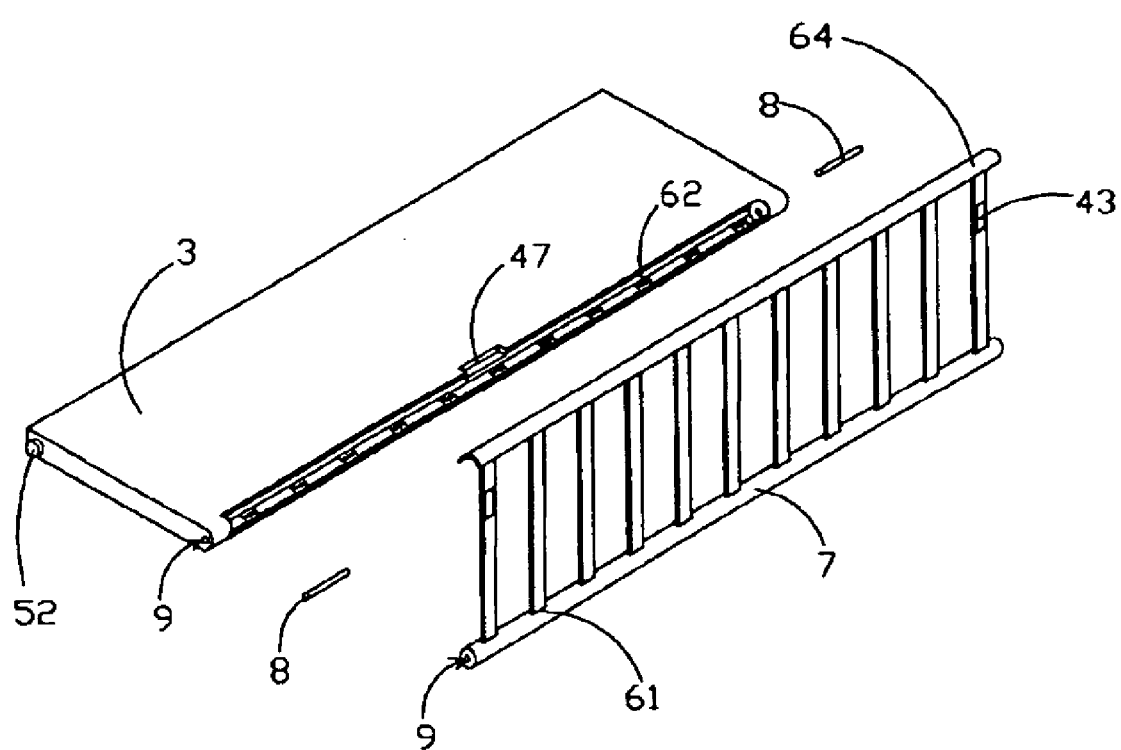
FIG. 4 shows an exploded isometric rear view of a Retractable Auxiliary Tailgate with an open frame back panel (5) that is retractable into the primary tailgate (3).

The slide-out embodiments of the Retractable Auxiliary Tailgate, and referred to throughout this specification and its appended claims as the Retractable Auxiliary Tailgate, have an open frame back panel (5) that may be retracted into or out-of the primary tailgate (3), as shown in FIGS. 1–8. The preferred embodiments of the Retractable Auxiliary Tailgate are of the open-frame variety, rather than a solid body back panel, and are designed so that the open frame for the Retractable Auxiliary Tailgate, may manually advance from within the primary tailgate (3), or manually retract into the primary tailgate (3), as shown in FIGS. 1–8. Once the open frame back panel (5) is fully advanced from the primary tailgate (3), as shown in FIG. 3, the open frame back panel (5) may be rotated approximately 90-degrees about the axis of the hinge (7), to set the open frame back panel (5) from the horizontal open position, as shown in FIG. 3, to the vertical open position, as shown in FIG. 1. The open frame back panel (5) fits through the horizontal back panel hinge (7), as shown in FIGS. 4–8, and is effectively locked onto the horizontal back panel hinge (7) with a plurality of frame locks (60) that are too large to fit through the aligned primary frame port (61) and secondary frame port (62), as shown in FIGS. 4–8. Each vertical frame for the open frame back panel (5) fits through a frame port (61), as shown in FIGS. 4–8. The hinge pin (8) for the present embodiment of the Retractable Auxiliary Tailgate is a set of two short hinge pins (8), as shown in FIGS. 4 and 5, so that the hinge pin (8) will not obstruct the path of the vertical frames of the open frame back panel (5), passing through the horizontal back panel hinge (7). Once the open frame back panel (5) is fully advanced from the horizontal closed position, as shown in FIGS. 2 and 3, to the horizontal open position, shown in FIGS. 3 and 7, there is a locking mechanism that would lock the frame lock (60) portion of the open frame back panel (5) into the horizontal open position, with the frame lock (60) set in the frame lock port (63), as shown in FIG. 7. Once the open frame back panel (5) is in the horizontal open position, the panel (5) may be rotated about the axis of the horizontal back panel hinge (7), and into the vertical open position, as shown in FIGS. 1 and 8, and there is a locking mechanism that would lock the frame lock (60) portion of the open frame back panel (5) into the vertical open position, with the frame lock (60) set in the secondary frame port (62), as shown in FIG. 8. A preferred locking mechanism utilizes a set of three positions for housing the open frame back panel (5) and its frame lock (60), and each of these three positions has a distinct locking means for the open frame back panel (5), as shown in FIGS. 1, 3, and 8, showing the closed position, the horizontal open position, and the vertical open position, respectively.

A modification of this slide-out embodiment for the Retractable Auxiliary Tailgate, may have a smaller open frame back panel (5), thereby acting effectively as a slide-out embodiment of an open frame Retractable Stop or the like.

A Set of Preferred Retractable Auxiliary Tailgate Embodiments

These preferred embodiments of the Retractable Auxiliary Tailgate are comprised essentially of a slide-out, open frame back panel (5) that is composed essentially of a metal, alloy, polymeric, or composite material, or a combination thereof, that is attached to the primary tailgate (3) with a horizontal back panel hinge (7) and a centrally located hinge pin (8) or the like. The horizontal back panel hinge (7) and its associated hinge pin (8) extend along the interface and axis of rotation of the primary tailgate (3) and the open frame back panel (5). In a preferred embodiment, the hinge pins (8) protrude from each end of the horizontal back panel hinge (7). Each protruding hinge pin (8) is matedly attached or affixed into a hinge pin port (9) located in the primary tailgate (3), with the horizontal back panel hinge (7) located near the top edge of the primary tailgate (3). The open frame back panel (5) may be rotated about the axis of the horizontal back panel hinge (7) by manipulating the back panel handle (6) or the top rail (64), and manually moving the open frame back panel (5) to the desired open position or to the closed position, and then releasing the optional cable-based locking mechanism connected to said handle (6). When the open frame back panel (5) is in the horizontal open position, as shown in FIGS. 3 and 7, it may lock into one of the plurality of positions, including the horizontal open position, as pre-determined by a back panel locking means or back panel catching means, such as a pin port housing (38). The back panel locking means may include one or more of the following: tongues, pins, spring loaded pins, or one or more spring loaded cable pins (29) or the like, tethered on one or more cables (25) and manually activated by a back panel handle (6), and which is a preferred locking means.

This preferred locking means for the open frame back panel (5) may be comprised essentially of a spring loaded cable pin (29) tethered on a cable (25). The cable (25) is attached on one end to a first cable port (26), which is attached to the back panel handle (6), by a cable port rivet (28), bolt and nut, weld, solder, or other fastening means. The back panel handle (6) pivots about the axis of rotation of the handle hinge (24), thereby pulling and activating the cable (25). The cable (25) is attached at the opposite end to a second cable port (27). There is a compression cable spring (30) fit around the second cable port (27), and said cable spring (30) is compressed between the cable spring stop (31) and the cable spring housing back (33), as shown in FIG. 9. A cable pin (29) is attached, affixed, or extending from behind the cable spring stop (31), as shown in FIGS. 9 and 10. The cable spring (30) and the cable spring stop (31) are housed in the cable spring housing (32), which is optimally closed on one end with a cable orifice (42) allowing a terminal end of the cable (25) attached to the second cable port (27) to protrude through said cable orifice (42), as shown in FIGS. 10 and 11. The cable spring housing (32) is optimally flanged with a mount flange (36) on the terminal end and with the cable pin (29) protruding from this end. The mount flange (36), is fit into the mount flange port (45), located at the terminal end of the back panel cable housing (34), as shown in FIGS. 10 and 11, and said mount flange (36) is sized so that it may fit or slide snugly into the mount flange port (45), thereby supporting and aligning the cable spring housing (32), within the back panel cable housing (34). That is, the mount flange (36) is affixed to the terminal end of the cable spring housing (32), and is sized so that the cable spring housing (32) may fit or slide into said end portion of the back panel cable housing (34), with the mount flange (36) snugly fitting a restraining area at the bottom of said back panel cable housing (34), thereby supporting and aligning the cable spring housing (32), within the back panel cable housing (34). The back panel cable housing (34) is aligned to allow the mating of the cable pin (29) with the cable pin ports (37), and is attached or affixed to the open frame back panel (5) by fastening means such as weld, solder, rivet, bolt, pressing into a track, and the like. The preferred locking means for these embodiments of the Retractable Auxiliary Tailgate has the spring loaded cable pin (29), which is manually activated and controlled by the back panel handle (6), fitting into a cable pin port (37) located on the pin port housing (38), and which is preferred to be centrally located on the primary tailgate (3), as shown in FIG. 9. The mechanism for controlling these two locking means at each end of the open frame back panel (5) would be controlled by the centrally located back panel handle (6), which would be hinged and would control two tethered cables (25), with each cable (25) controlling a separate locking means.

The preferred embodiments of the Retractable Auxiliary Tailgate may have a handle recessed area (47) located on the rear side of the primary tailgate (3) to receive the back panel handle (6) and to allow the user to easily fit their fingers into the recessed area (47) for manipulation of the back panel handle (6).

Modified embodiments of the Retractable Auxiliary Tailgate could have such locking means, as disclosed above, on each end of the primary tailgate (3). When the user wishes to disengage the cable pin (29) locking means, the user may pull on the back panel handle (6), thereby releasing the cable pin (29) from the cable pin port (37), and the user would then pull-out the open frame back panel (5) to the desired position, and release the back panel handle (6), allowing the spring loaded cable pin (29) to engage drop into the aligned cable pin port (37), thereby locking the open frame back panel (5) of the Retractable Auxiliary Tailgate into place in the desired position.

The drawing figures and the general concepts and locking means shown in the drawing figures illustrating the invention, show various embodiments of the Retractable Auxiliary Tailgate. Hybrid and composite embodiments of the Retractable Auxiliary Tailgate may be derived from the drawing figures and specification, by addition, elimination, and replacement of components, and would be combinatorial and numerous, but are intended to be incorporated herein, and to reflect further embodiments of the present invention.

Some Modified Embodiments of the Retractable Auxiliary Tailgate

Other embodiments of the Retractable Auxiliary Tailgate, disclosed above, may be constructed by applying side panels or the like to a back panel (5) or to an extended arm (21) or the like. In some hybrid embodiments, metal or plastic side panels may be utilized with the back panel (5), and may be comprised essentially of a flexible, fabric, or netting material, thereby simplifying the manufacture and reducing the manufacturing costs, and still getting a favorable design. In such hybrid embodiments, the fabric or netting material may be attached, hooked, or affixed to the truck bed wall (2) with a hasp/hasp orifice means, or by a hook or tying means.

A reflector (43) may also be added to the back of the back panel (5) as a safety feature.

Hybrid and composite embodiments may be derived from the drawing figures and specification by addition, elimination, and replacement of components, and would be combinatorial and numerous, but are also intended to reflect the present invention.

In short, a set of simple embodiments of the Retractable Auxiliary Tailgate may be comprised essentially of a back panel (5) attached to a primary tailgate (3), with a horizontal back panel hinge (7) located at the interface and axis of rotation between said back panel (5) and said primary tailgate (3), with said horizontal back panel hinge (7) providing an axis of rotation for the back panel (5), and said axis of rotation terminates at one of two ends of an arc, with said back panel (5) in an upright position, due to a hinge locking means. The horizontal back panel hinge (7) has a hinge pin (8) that is fit through a hinge pin port (9), said hinge pin port (9) is also located along said interface between the back panel (5) and the primary tailgate (3). The hinge pin port (9) provides an axis of rotation for the back panel (5), and said axis of rotation terminates at one of two ends of an arc, with said back panel (5) in an upright position, due to a hinge locking means.

Other embodiments of the Retractable Auxiliary Tailgate may also include kits, including partially-assembled kit embodiments, which are comprised essentially of the components utilized in the various above-described embodiments, but are packaged and marketed as a kit or the like, to be added onto an existing truck or the like.

This specification and drawing figures are a divisional of parent patent application, Ser. No. 09/795,170, filed Feb. 27, 2001, and published as U.S. Patent Application Publication No. 2002/0121794 A1, on Sep. 5, 2002, and issued as U.S. Pat. No. 6,742,822 (2004). The entire declaration, oath, specification, disclosure, and drawing figures, and each of them, from said parent patent application are relevant and related to the present disclosure and divisional patent application, and are hereby incorporated herein by reference, thereto.

While I have shown and described in this disclosure and its appended drawing figures, and which are a part of and incorporated in said disclosure, only selected embodiments in accordance with the present invention, it is understood that the same is not limited thereto, but is susceptible to numerous changes and modifications as known to one having ordinary skill in the art, and I therefore do not wish to be limited to the details shown and described herein, but intend to cover all such modifications, changes, eliminations, combinations and hybrids, as are encompassed by the scope of the appended claims.

I claim:

1. A Retractable Auxiliary Tailgate, comprised essentially of:
   a. an open frame back panel with a top rail located along a top end of said open frame back panel, and with a plurality of frame locks located on opposite end of the open frame back panel;
   b. said open frame back panel is attached to a primary tailgate, with a horizontal back panel hinge by means of a set of hinge pins matedly fit into a set of corresponding hinge pin ports, thereby holding said horizontal back panel hinge to said primary tailgate;
   c. the open frame back panel is retractable within the primary tailgate, when said Retractable Auxiliary Tailgate is in its closed position, and with only said top rail visible along said primary tailgate's top end;
   d. said open frame back panel is moved to its horizontal open position by pulling the open frame back panel out of the primary tailgate, and through the horizontal back panel hinge, and through a sets of primary frame ports, until said open frame back panel emerges from within said primary tailgate, and then said frame locks each fit into a frame lock port;
   e. the open frame back panel is moved to its vertical open position by pulling said open frame back panel to its horizontal open position, and then rotating the open frame back panel, with said horizontal back panel hinge being an axis of rotation, from a horizontal position to the vertical position, and then setting said open frame back panel into a set of secondary frame ports, where the open frame back panel is then effectively locked into its vertical open position.

2. A Retractable Auxiliary Tailgate, as recited in claim 1, and further comprised essentially of a set of reflectors attached to said open frame back panel.

3. A Retractable Auxiliary Tailgate, as recited in claim 1, and further comprised essentially of a retractable stop affixed to the top rail, and such that said open frame back panel may still retract into the primary tailgate, with said top rail visible along said primary tailgate's top end.

* * * * *